United States Patent [19]
Bauer et al.

[11] Patent Number: 5,883,356
[45] Date of Patent: Mar. 16, 1999

[54] LASER SCORING PROCESS AND APPARATUS

[75] Inventors: David J. Bauer, deceased, late of Allen Park, by John W. Bauer, Jr., executor; Michael P. Towler; Thomas W. Weber, both of Ann Arbor, all of Mich.

[73] Assignee: Tip Engineering Group, Inc., Farmington Hills, Mich.

[21] Appl. No.: 645,328

[22] Filed: May 13, 1996

[51] Int. Cl.[6] .................................................. B23K 26/02
[52] U.S. Cl. ............................. 219/121.62; 219/121.68; 219/121.69; 219/121.85
[58] Field of Search .......................... 219/121.6, 121.61, 219/121.62, 121.68, 121.69, 121.78, 121.82, 121.83, 121.85, 121.76; 264/400; 156/272.8

[56] References Cited

U.S. PATENT DOCUMENTS

| | | | |
|---|---|---|---|
| 3,626,143 | 12/1971 | Fry | 219/121.69 |
| 4,102,571 | 7/1978 | Hayamizu et al. | 356/3.02 |
| 4,124,965 | 11/1978 | Stahl | 53/412 |
| 4,501,961 | 2/1985 | Stauffer | 356/4.03 |
| 5,001,325 | 3/1991 | Huzinga | 219/121.69 |
| 5,158,499 | 10/1992 | Guckenberger | 206/524.2 |
| 5,210,593 | 5/1993 | Kramer | 356/381 |
| 5,504,303 | 4/1996 | Nagy | 219/121.68 |
| 5,744,776 | 4/1988 | Bauer | 219/121.7 |

FOREIGN PATENT DOCUMENTS

| | | |
|---|---|---|
| 2-99324 | 4/1990 | Japan . |
| 2276354 | 9/1994 | United Kingdom . |

*Primary Examiner*—Gregory L. Mills
*Attorney, Agent, or Firm*—John R. Benefiel

[57] ABSTRACT

Process and apparatus for precision scoring a workpiece of variable thickness and/or shape in which the thickness of the workpiece at points along a trace pattern is first determined, and a variable depth groove is thereafter formed by laser scoring which is controlled in correspondence with the previously determined thickness values. These values can be determined by scanning opposite surfaces on the surface of a locating fixture and a surface of the workpiece. Robot manipulators are used for scanning and scoring, and the power of the laser and/or the trace velocity are controlled to vary the degree of scoring. The scoring is used to special advantage for precision preweakening of auto trim pieces for creating an air bag deployment opening.

28 Claims, 6 Drawing Sheets

LASER SCORING PROCESS AND APPARATUS

BACKGROUND OF THE INVENTION

This invention concerns laser scoring of an automotive interior trim piece in which a laser beam is used to score the surface of material, as to create a line of preweakening.

It has previously been proposed to create a preweakening of a trim piece to allow a deployment "door" to be formed by the pressure of an inflating air bag causing an outer covering as a layer of vinyl plastic to rupture in a desired pattern to form an opening allowing the air bag to deploy into the passenger compartment from a storage canister mounted behind the trim piece.

This construction is useful for so-called invisible seam construction installations particularly for the passenger side, in which the location of the air bag is concealed by the absence of any externally perceptible suggestion of a deployment opening door.

The use of the pressure generated by the inflating air bag to rupture the covering skin requires that a precisely controlled preweakening of the covering be carried out.

The air bag must perform reliably over a wide range of ambient temperature conditions. The strength and elongation characteristics of the covering layer, typically of a tough plastic such as vinyl or leather, JPO, TPE, or TPU, varies considerably with ambient temperature. If the covering layer presents too much resistance to rupture, proper deployment of the air bag may not occur due to the resulting delay in overcoming resistance of the covering layer.

At the same time, the preweakened covering must retain sufficient strength so as to not crack or show the line of preweakening on the passenger side.

Covering layers, particularly when made of cast plastic, typically are of irregular thickness due to the inherent lack of precision of the manufacturing process. This variation in thickness makes it difficult to execute preweakening by scoring, as a scored groove of constant depth will result in an erratic preweakening at points along the door pattern since the thickness of the remaining material will vary.

This in turn causes erratic air bag performance due to variations in the precise moment when the air bag will burst through the covering layer.

Production in the automotive field involves large numbers of parts and such air bag system components should desirably have a very low defect rate, i.e., one part per million or less so as to be consistent with current standards.

The object of the present invention is to provide processes and apparatus for precision laser scoring of workpieces which are of varying thickness.

SUMMARY OF THE INVENTION

This object, as well as others which will be understood upon a reading of the following specification and claims are achieved by a sensor arrangement which scans the opposite surfaces of a workpiece in a predetermined scoring pattern at a selected location in order to generate coordinate data from which the material thickness can be determined at each point along the pattern.

Corresponding data is stored in a computer memory and a control program for a scoring laser is generated in which the tracing speed and/or power intensity of the scoring laser beam are varied at points along the scoring pattern so as to vary the depth of the groove in proportion to the material thickness at each point to create a desired thickness of remaining material along the pattern defining a tear seam to insure a precisely controlled preweakening of the sheet material along the pattern.

The groove pattern is scanned after the scoring operation to confirm the thickness of the tear seam at each point along the pattern.

The prestoring scanning may be carried out by laser beam gaging moved relative the workpiece to trace the scoring pattern on opposite surfaces of the workpieces to generate coordinate measurements of the opposite surfaces at each point along the pattern, from which are derived a record of the material thickness at each point along the pattern.

Multiaxis robot manipulator devices can be employed to cause the sensors and/or the scoring lasers to trace the pattern on the workpiece. The scanning sensors can be mounted to a single robot so that the movement for prescanning, scoring, and post process inspection is carried out simultaneously in a single station. These steps can also be carried out by multiple passes or by separate robot manipulators in two separate stations.

In the two station setup, the workpiece and the fixturing therefore is shuttled between gaging and scoring stations with suitable locator mechanisms or reference fiducials employed to precisely determine the relative workpiece position in each station.

In one alternative, the workpiece is precisely positioned in a fixture as by being vacuum held therein. Initially, prescanning the fixture surface in the scoring pattern is carried out to develop corresponding data. Subsequently, the workpiece is clamped in the fixture and scanned in the same trace pattern. The workpiece thickness along the pattern can then be determined to develop the laser scoring power/speed control program.

In yet another alternative, the fixture can be scanned in the predetermined scoring pattern. The scoring laser is then controllably displaced preferably normally to the workpiece surface as it is traced along the pattern with the workpiece in place on the fixture so as to locate the focal point of the laser beam at a constant distance above the scanned fixture surface. This results in a variable scoring depth, but a constant thickness of remaining material since the laser beam will cut away all material in its path above its focal point.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
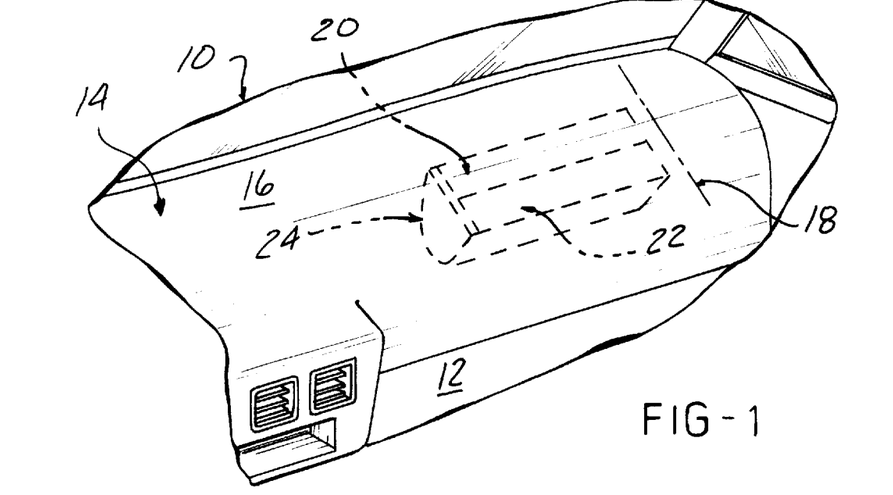
FIG. 1 is a fragmentary, perspective view of an instrument panel and air bag device having a covering which is preweakened by scoring in a pattern corresponding to the air bag deployment opening.
Figure 1A:
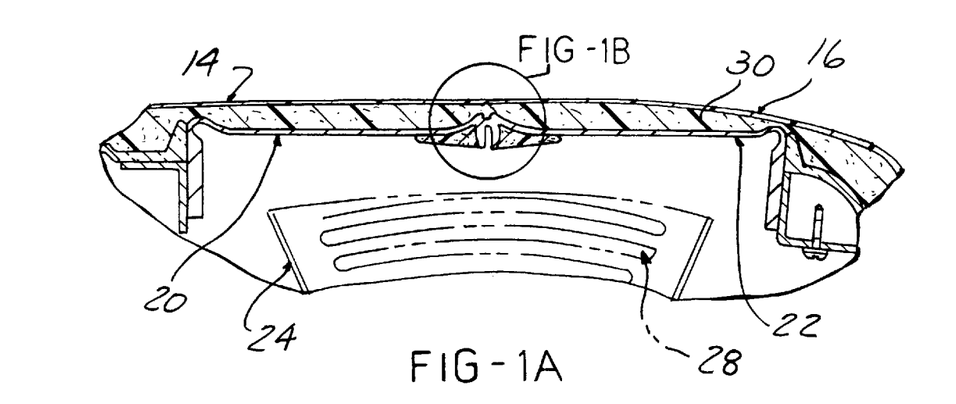
FIG. 1A is an enlarged sectional view of a portion of the instrument panel shown in FIG. 1.
Figure 1B:
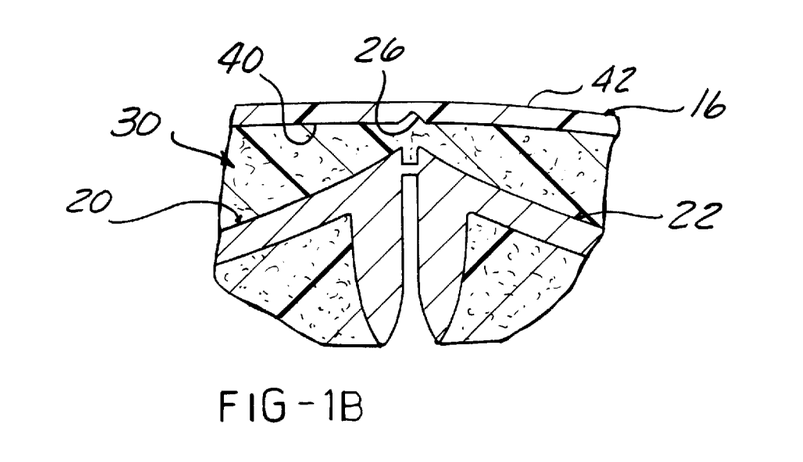
FIG. 1B is a further enlarged view of a portion of the section shown in FIG. 1A.

Referring to the drawings and particularly FIGS. 1, 1A, and 1B, a portion of an instrument panel 14 is shown along with a portion of an automotive vehicle 10 having a passenger compartment 12. The instrument panel 14 has a covering 16 which is preweakened in an H-pattern 18 such as to enable the formation of a pair of doors 20 and 22, which when opened form a deployment opening for an air bag device 24 mounted behind the instrument panel 14 and aligned with the deployment opening to be formed by opening of the door panels 20 and 22.

The preweakening pattern 18 is invisible from the passenger space 12, being defined by a scoring 26 on the undersurface of the covering layer 16 as best seen in FIG. 1B. The pattern shown is for a double door deployment opening. A U-shaped pattern is employed for single doors and various patterns including an X-pattern is contemplated for four door deployment openings.

The deployment opening is created at the moment of inflation of the air bag cushion 28, the force exerted by the inflating air bag cushion on the inside of the door panels 20 and 22 creating a pressure, such as to cause the covering 16 to rupture in the H-pattern 18. This allows an outward hinging of the deployment door panels 20, 22 to thereby form the air bag deployment opening.

Various constructions of the trim pieces, i.e., instrument panel 14, are known which typically involve a foam layer 30 underlying the covering 16. The covering 16 provides an aesthetically pleasing surface exposed to view within the passenger compartment 12.

Other currently utilized trim piece constructions which can be preweakened in the same manner are hard plastic, vinyl cladding over hard plastic, and the above-described skin and foam.

As discussed above, the scoring 26 is preferably carried out so as to achieve a precisely controlled preweakening. Too shallow scoring will result in the too high resistance of the covering layer bursting. The covering 16 is typically of a tough plastic such as vinyl, so that minor variations in tear seam thickness will interfere with the proper deployment of the air bag.

If the scoring 26 is too deep, this may result in marring of the external appearance of the instrument panel 14 or vulnerability to splitting particularly when subjected to external pressure exerted by incidental contact with the instrument panel surface, or to long-term sun and/or heat exposure.

Figure 2:
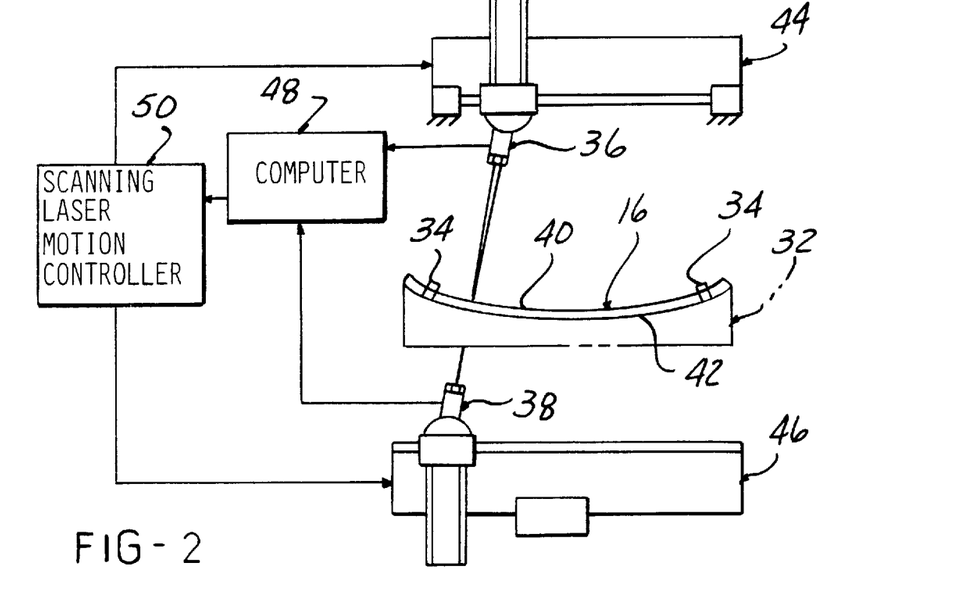
FIG. 2 is a diagrammatic representation of a workpiece scanning apparatus for developing a record of the workpiece thickness along a pattern to be scored therein.
Figure 2A:
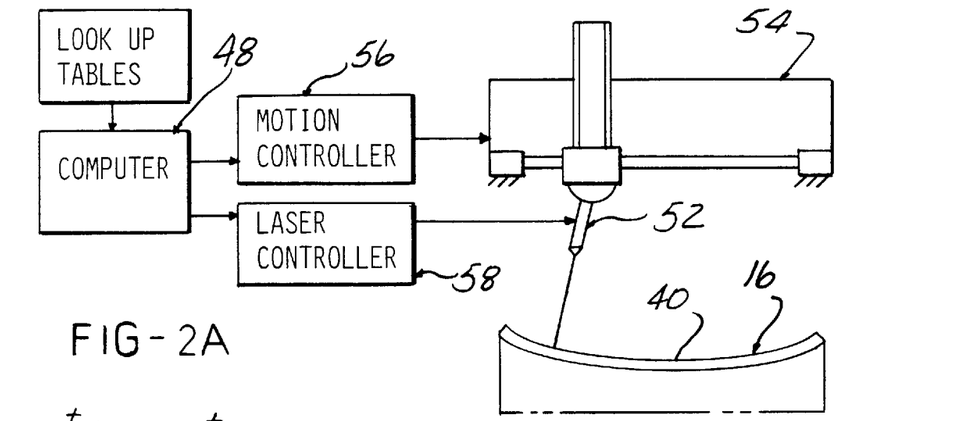
FIG. 2A is a diagrammatic representation of laser scoring apparatus for carrying out the scoring of the workpiece using the thickness data developed in the prior scanning operation.

FIGS. 2 and 2A illustrate the basic concept of the process of precision scoring of the covering 16. The covering 16 may be formed by a casting process which has a defined contained shape prior to being mounted to the remaining components of the instrument panel.

The cast covering 16 workpiece is positioned in a suitable fixture 32 with locating features 34 mating with existing openings in the covering 16, such as air conditioning duct outlets.

Sensing means is initially utilized to detect the precise thickness of the covering 16 at points along the scoring pattern 18. The sensing means illustrated diagrammatically in FIG. 2 is comprised of a first sensor 36 and a second sensor 38 which together scan the surface 40 of the skin 16 to be scored as well as the opposite surface 42 on the other side of the covering 16.

The sensors 36 and 38 may comprise so-called laser triangulation sensors which are commercially available. These sensors are mounted on manipulator devices 44 and 46, which allow the sensors 36 and 38 to scan the respective surfaces of the covering 16 in the scoring pattern, while maintaining a perpendicularity to the surfaces at each point despite the presence of any curvature or other topographical features of the covering layer 16 at a particular point along the scoring pattern. The manipulator devices 44, 46 comprise mechanisms enabling powered movement along orthogonal axes and tilting of the sensors about each of these axes. Suitable carriage, way, and swivel mount structures are indicated, but multiaxis robot devices such as are commercially available are preferred as described hereinafter.

The sensors 36 and 38 transmit coordinate data to a computer 48. From this coordinate data, the thickness of the covering layer 16 at each point along the scoring pattern 18 may be determined.

The computer 48 may also be used to operate a motion controller 50 which causes the manipulator devices 44 and 46 to execute the necessary motions to scan the scoring pattern.

The thickness data so derived is utilized as indicated in FIG. 2A in controlling a scoring laser 52 which is likewise mounted for manipulation by a manipulator device 54 so as to be able to trace the scoring pattern 18 to carry out the scoring of the inside surface 40 of the covering layer workpiece 16. A suitable motion capability of the manipulator device should be provided to allow a predetermined distance above the workpiece to be maintained.

A suitable motion controller 56 utilized for this purpose is operated by the computer 48 and suitable motion programming as is used with commercial robot manipulators.

An empirically developed "lookup" table can be provided which consists of a set of data in which the correlation among a power density of the scoring laser 52 and the speed of the manipulator device corresponding depth of groove scoring is listed. This data is correlated with the thickness data determined in the scanning of the covering skin workpiece in the scoring pattern 18 so as to select the power intensity level necessary to remove material to a depth sufficient to leave a desired thickness of material remaining after the scoring has been completed at each point along the scoring pattern 18.

Figure 3:
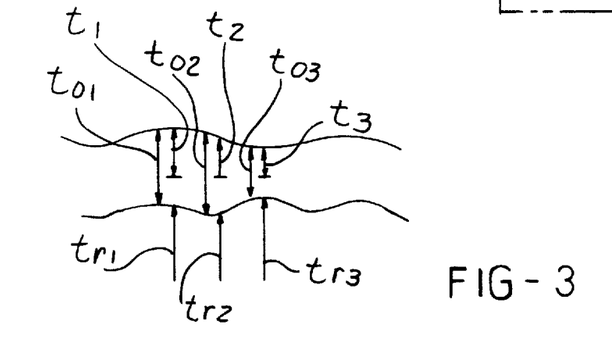
FIG. 3 is an enlarged diagram of the covering indicating the material thickness groove.

This is indicated in FIG. 3 where the overall thickness $t_{01}$, $t_{02}$, $t_{03}$ determines the depth of the groove $t_1$, $t_2$, $t_3$ at these points so as to result in a desired remaining material thickness $tr_1$, $tr_2$, $tr_3$ at various points along the trace pattern 18.

The scoring depth may also be controlled by varying the velocity of movement of the laser beam along the trace pattern 18 with a constant power level, in which case the motion controller 56 creates a varying velocity of movement of the scoring laser 52 as it traces the pattern along the scoring pattern 18.

Combinations of varying laser power density and trace velocity to produce a desired scoring depth are also a possibility.

Suitable computer software for carrying out such laser control is available from Servo Robot, Inc. of Boucherville, Quebec, Canada who also offers suitable scanning triangulation sensors such as are contemplated for the first and second sensors 36 and 38 indicated and depicted diagrammatically in FIG. 2.

It is also possible to cause the trace scanning and scoring of the lasers and sensors by means of optical systems which steer the laser beams.

Figure 4:
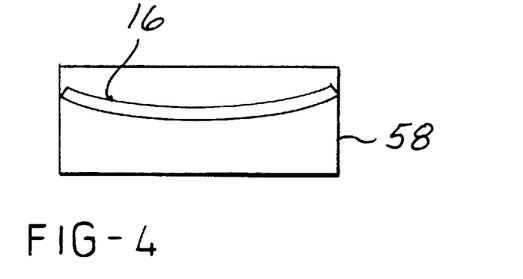
FIG. 4 depicts a cast covering layer workpiece to be scored.

FIG. 4 indicates a so-called cast covering layer 16 which is molded within a mold 58 which process is not carried out under pressure such that considerable variation in the material thickness of the covering layer 16 is typically encountered.

Figure 4A:
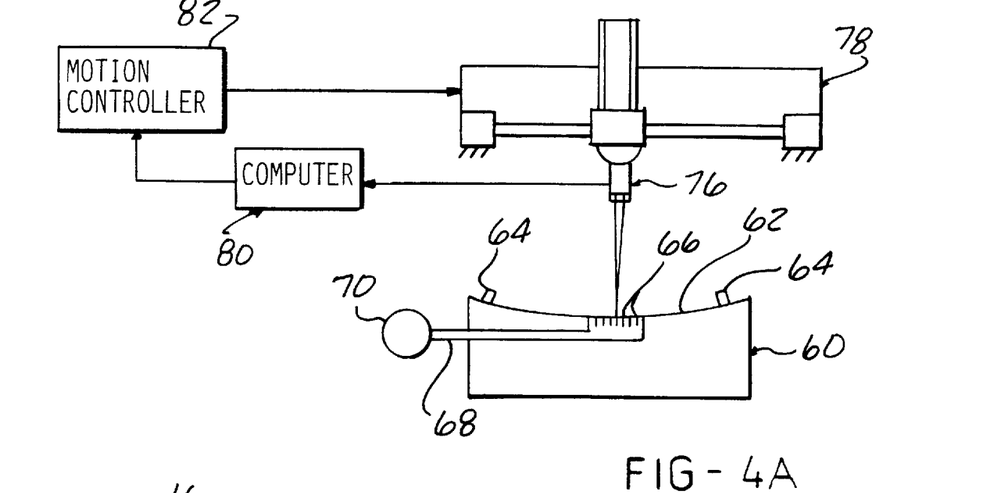
FIG. 4A is a diagrammatic representation of a scanning apparatus for an alternative process for determining the thickness of the workpiece along the scoring pattern, particularly suited for a cast covering layer.
Figure 4B:
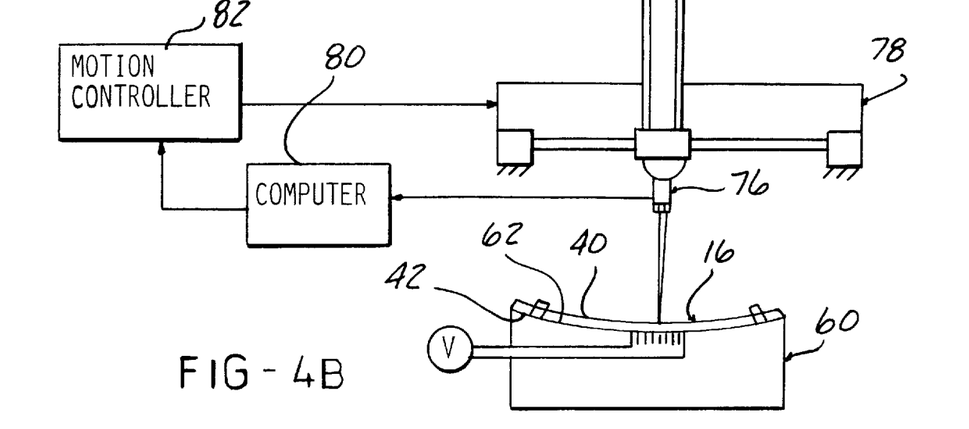
FIG. 4B is a diagrammatic representation of a second stage scanning apparatus to carry out the alternative process.
Figure 4C:
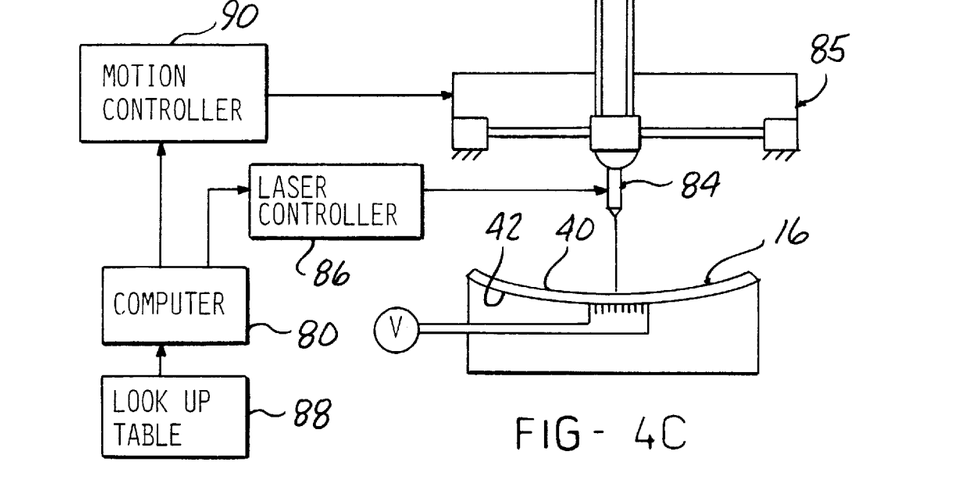
FIG. 4C is a diagrammatic representation of scoring apparatus to be used in the alternative method.

The covering layer 16 when cast has particular contours. FIGS. 4A–4C depict diagrammatically a variation of the process shown in FIGS. 2 and 2A suited particularly to such cast covering layer workpieces.

A fixture 60 has an inner contour 62 shaped to receive the workpiece 16. The contour 62 is initially scanned at the particular location of the trace pattern 18 along the path of the trace pattern such as to develop coordinate electronic signals corresponding to the coordinates in space of the surface 62 of the fixture 60 at points along the trace pattern 18.

Locating features 64 are provided on the fixture 60. Also provided is a suitable hold-down such as a vacuum holder defined by a pattern of holes 66 communicating with a passage 68 connected to vacuum pump 70 for purposes that will be described hereinafter.

The tracing may be carried out by a triangulation gaging laser 76 mounted on a motion manipulator device 78 which allows tracing of the pattern on the surface 62.

The electronic signals corresponding to the coordinate data are transmitted to a computer 80 which may also operate the motion controller for the manipulator device 78.

The workpiece 16 is then placed in the fixture 60 in a vacuum chucking arrangement, which when activated acts to pull the opposite surface 42 of the covering layer 16 firmly against the surface 62 of the fixture 60. The scanning laser 76 is then operated to scan the inner surface 40 of the workpiece 16 at points along the trace pattern 18, which coordinate data is transmitted in the form of electronic signals to the computer 80 which again may control the motion controller 82 for the manipulator device 78 using commercially available software.

Two sets of data corresponding to the fixture surface 62 and the covering layer surface 40 allow determination of the thickness of the covering layer precisely at points along the trace pattern 18, which thickness data is stored in the computer 80.

FIG. 4C shows a scoring laser 84 caused to trace the same pattern 18 by means of a manipulator device 85 to carry out scoring of the inner surface 40 of the covering layer 16. The depth of the groove is controlled by laser controller 86 which in turn receives commands from the computer 80. Command signals from the computer 80 combine the thickness information for each point along the trace pattern 18 and laser power data contained in a lookup table 88. This data may as before correlate the power density of the scoring laser 84 with the depth of groove produced in a particular material of the covering workpiece 16 such as to create a score depth at each point along the trace pattern 18 calculated to leave a desired remaining thickness of material at each point along the trace pattern on the covering layer workpiece 16.

As before, the computer 80 may be utilized to operate a motion controller 90 for the manipulator device 86. As before, the computer 80 can also be utilized to operate the motion controller 82 for executing the motion of the scoring laser 84 so as to trace the pattern 18 while maintaining perpendicularity and desired spacing above the surface of workpiece 16. Thus, combinations of variations in the power density in the laser beam and the velocity of the trace movement can be utilized to control the depth of the groove scored into the surface 40 of the cover layer 16 workpiece.

The vacuum holding insures that the opposite surface 42 of the covering layer 16 is held in tight contact with the surface 62 of the fixture 60 such that there is a close correlation in the thickness as calculated using the coordinate data of the surface 62 and the surface 40 of the covering layer 16, such as to provide accurate control over the depth of the scoring.

Figure 5:
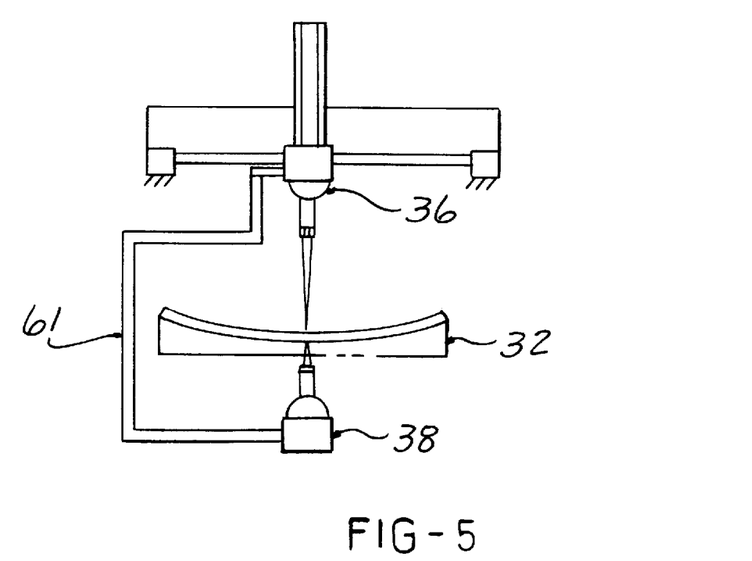
FIG. 5 is a diagrammatic representation of apparatus for simultaneously scanning opposite surfaces of a workpiece.

FIG. 5 indicates diagrammatically that the sensors 36 and 38 can be connected together with a U-shaped structure 61 to be moved simultaneously. It is noted that the fixture 32 must be slotted along the trace pattern 18 to allow sensing of the undersurface 42 of cover 16.

Figure 6:
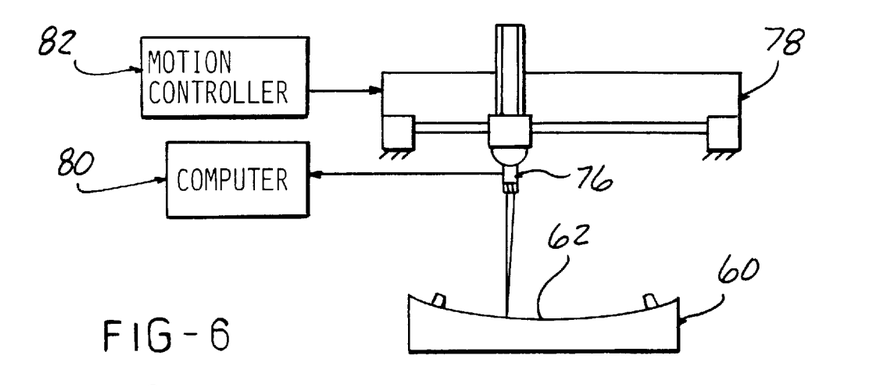
FIG. 6 is a diagrammatic representation of apparatus for carrying out another alternative process for carrying out workpiece scoring, depicting prestoring scanning of a fixture used to locate the workpiece.
Figure 6A:
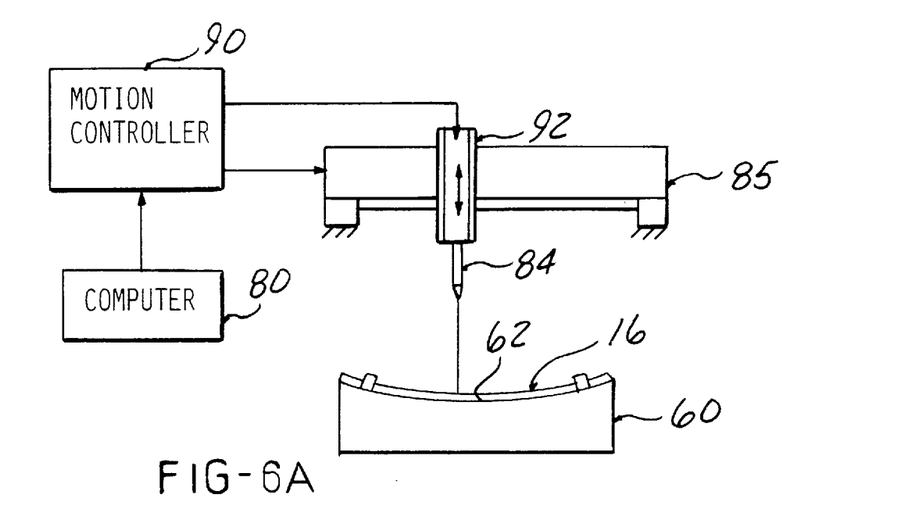
FIG. 6A is a diagrammatic representation of apparatus for carrying out the process of precision scoring of a workpiece, using data developed by the apparatus of FIG. 5.

FIGS. 6 and 6A illustrate yet another alternative in which the surface 62 of the fixture 60 is scanned as before by the scanning laser 76 to generate coordinate data corresponding to the surface 62 at points along the trace pattern 18 which is transmitted to the computer 80.

However, rather than power intensity control, the computer 80 is utilized to control the motion controller 90 by a Z axis motion controller 92 which moves the scoring laser 84 vertically along the Z axis so as to maintain the focal point of the laser beam at a fixed distance and perpendicular relative to the surface 62 of the fixture with the workpiece 16 in position on the fixture 60.

Since the laser beam will cut all material above the focal point, the groove will be formed down to the location of the focal point of the beam. If the beam focal point is maintained a desired distance from the surface 62, and if the beam is also preferably held to be in a perpendicular orientation from the fixture surface 62, a constant thickness of remaining material will result.

It should be noted that the particular groove depth and thickness of the material is a matter for specification by the product designer, which specification will vary with the air bag system requirements and the material of the covering layer 16, the geometry of the deployment opening, etc.

Such considerations do not form a part of the present invention.

Figure 7:
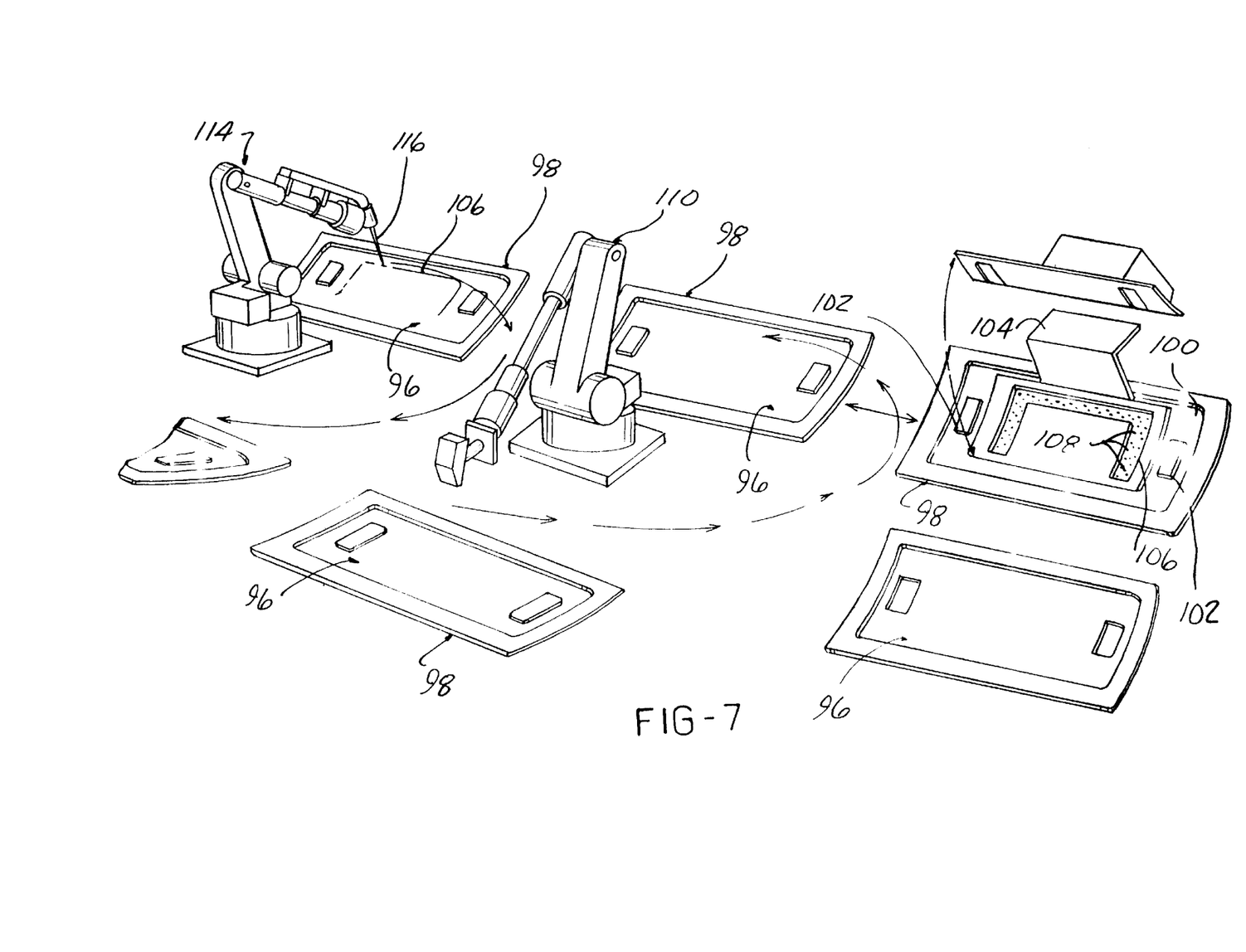
FIG. 7 is a perspective view of preferred apparatus for carrying out the preferred process for precision scoring of a workpiece, also shown in FIG. 7.

FIG. 7 shows an actual apparatus and process for scoring a workpiece 96, which is depicted as a cast covering layer, which is placed in a fixture 98 having a locating recess 100, in the workpiece 96 to be received therein. Locating features 102 are also used, as mentioned above.

A clamping mechanism 104 is also used to compress the region of the workpiece within which the trace pattern, here indicated as a U-pattern 106, is located.

The clamp 104 has a U-shaped cutout so as to allow the laser beam of the sensors and scoring laser generators 112, 116 to access the surface of the fixture 98 as well as the workpiece 96.

A vacuum chucking in the region of the cutout is enabled by a series of openings or holes 108 connected to a vacuum source to press the workpiece to the workpiece fixture surface 100 in the regions immediately adjacent the trace pattern 106.

A first station indicated in the center of FIG. 7 shows a robot manipulator 110 which mounts a sensing laser generator 112 of the triangulation type mentioned above which is utilized to generate coordinated information at points along the trace pattern 106 for both the fixture 98 and the workpiece 96 as in the arrangement depicted diagrammatically in FIGS. 4A–4C.

A second station has a second robot manipulator 114 located to enable scoring along the trace pattern 106 of the inner surface of the workpiece 96. The clamping mechanism 104 is used to compress the region of the workpiece adjacent the trace pattern, here indicated as a U pattern 106.

The clamping mechanism 104 is not shown in the robot stations for a clearer understanding.

The scoring laser 116 is controlled to vary the degree of grooving carried out by the scoring laser beam.

The workpiece and fixtures are moved downstream to subsequent stations opposite the first gaging station at which the gaging robot manipulator 110 is relocated for post process inspection of the groove formed along the trace pattern 106.

The coordinate information concerning the groove can be stored for historical reference in association with each workpiece produced.

Figure 8:
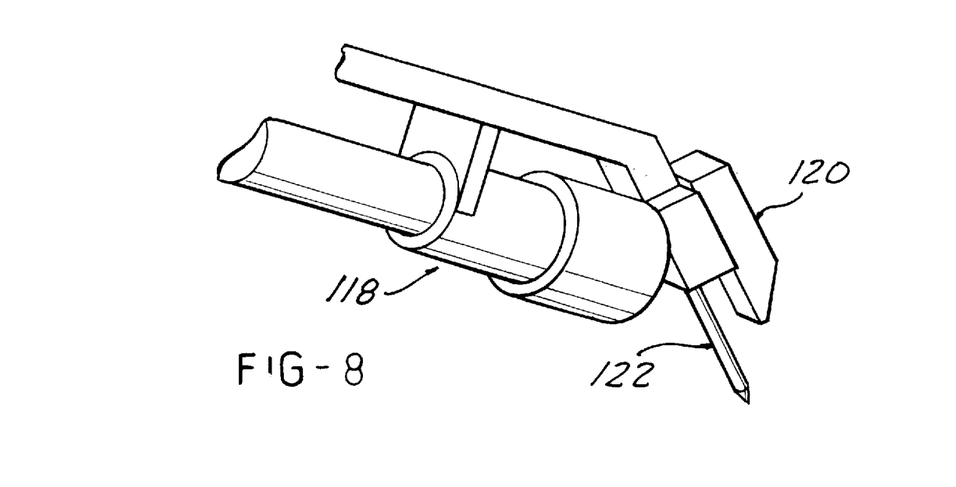
FIG. 8 is a fragmentary perspective view of a portion of a robot manipulator showing an alternate configuration of the apparatus according to the invention.

FIG. 8 illustrates an arrangement in which a single robot manipulator 118 has a scanning gaging laser generator 120 and a scoring laser 122 both mounted thereto. This arrangement allows the scanning of the trace pattern 106 and subsequent scoring with a single robot such as to carry out both scanning and scoring in a single station, eliminating the need for handling of the workpiece and fixturing from station to station and also the need to locate and recalibrate as each fixture is moved from station to station.

Figure 9:
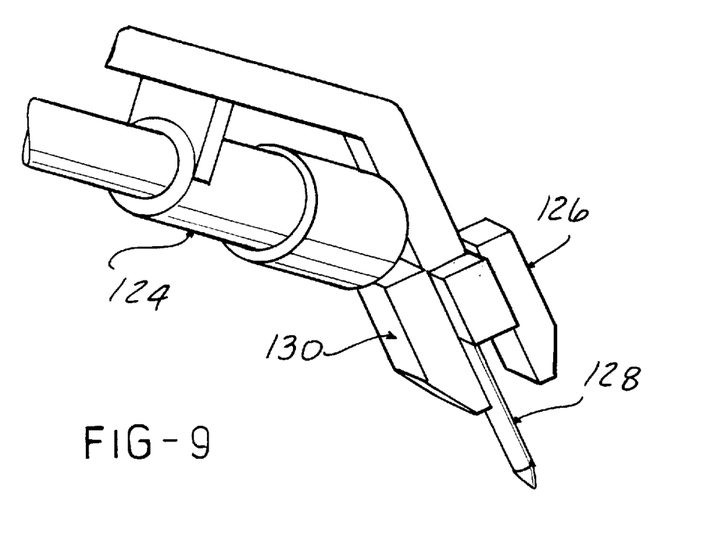
FIG. 9 is a fragmentary perspective view of a portion of a robot manipulator showing another alternative configuration of the apparatus according to the invention.

In FIG. 9, this concept is carried one step further in which a robot manipulator 124 has attached a preprocessing scanning laser generator 126, a laser scoring generator 128 and a post process scanning laser generator 130 so that all three steps can be carried out in a single pass with a single manipulator and at a single station.

We claim:

1. Apparatus for precision scoring of one side of a workpiece having a defined contoured shape to preweaken said workpiece in a predetermined pattern, said apparatus comprising:

a workpiece fixture complementarily shaped to said workpiece to receive and locate said workpiece in a predetermined position thereon; said fixture having a locating surface for mating with a surface of said workpiece opposite said surface to be scored;

sensor means for sensing a thickness of said workpiece at points along said predetermined pattern and generating stored data corresponding to values of said sensed workpiece thickness at said points along said pattern, said sensor means including detector means for detecting the location of said workpiece fixture locating surface at points along said pattern to be scored;

scoring laser generating means for generating a laser beam capable of scoring a surface of said workpiece;

motion controller means for causing said laser beam to trace said workpiece surface along said pattern; and, laser control means for controlling a degree of scoring of said workpiece surface at points along said pattern as said laser beam traces said pattern in correspondence with said set of stored data generated by said sensor means so as to score said workpiece in said pattern to a controlled extent along said pattern.

2. The apparatus according to claim 1 wherein said laser control means controls said laser beam so as to vary a depth of scoring of said workpiece to produce a controlled remaining thickness of said workpiece along said pattern.

3. The apparatus according to claim 1 wherein said laser control means controls the intensity of said laser beam to vary the extent of workpiece scoring.

4. The apparatus according to claim 3 wherein said laser control means includes stored laser beam intensity values predetermined to produce a corresponding extent of scoring, and said intensity values are set in correspondence with said sensed workpiece thickness values to produce a desired thickness of material remaining after scoring.

5. The apparatus according to claim 1 wherein said laser control means varies a velocity with which said scoring laser beam traces said pattern to control the extent of scoring of said workpiece.

6. The apparatus according to claim 1 wherein said laser control means controls a depth location of a focal point of said laser beam relative to said workpiece surface to be traced by said scoring laser beam.

7. The apparatus according to claim 1 wherein said sensor means includes a first sensor detecting a location of a surface of said workpiece to be scored at points along said pattern and generating a corresponding set of stored signals.

8. The apparatus according to claim 7 wherein said sensor means combines said stored signals of said first sensor and said detector means to determine said thickness of said workpiece at points along said pattern to be traced.

9. The apparatus according to claim 7 wherein said first sensor comprises a laser gaging sensor generating a gaging laser beam tracing said workpiece surface in said predetermined pattern prior to scoring of said surface by said scoring laser beam.

10. The apparatus according to claim 1 wherein said sensor means includes a sensor carried by said motion control means for said scoring laser to scan said workpiece surface in said pattern just prior to scoring by said scoring laser beam.

11. The apparatus according to claim 10 further including post scoring sensor means carried by said motion control means for scanning said scoring carried out by said scoring laser beam and generating a stored set of corresponding signals.

12. The apparatus according to claim 1 wherein said apparatus further includes a: first station whereat said workpiece is scanned by said sensor means and a second station in a second position, whereat said workpiece surface is scored by said scoring laser beam and also includes means for shifting said workpiece from said first to said second station.

13. The apparatus according to claim 1 further including means for pressing said workpiece against said fixture locating surface.

14. A method for precision scoring a surface of an automotive trim piece workpiece having a defined contoured shape to preweaken said workpiece in a predetermined pattern, said method comprising of steps of:

positioning said workpiece in a workpiece fixture shaped in correspondence to said contoured shape of said workpiece to be located therein in a predetermined position, said workpiece fixture having a locating surface against which is abutted a surface of said workpiece opposite said surface to be scored;

sensing a thickness of said workpiece at points along said predetermined pattern and generating a set of scored data corresponding to values of the thickness of said workpiece sensed at said points along said pattern, including the step of detecting the location of said workpiece fixture surface at points along said pattern to be scored and generating a stored set of corresponding signals;

generating a laser scoring beam from a source capable of scoring said surface of said workpiece;

causing said laser beam to trace said workpiece surface along said pattern; and, controlling a scoring effect of said laser beam so as to vary a degree of scoring of said workpiece surface at points along said pattern as said laser beam traces said pattern in correspondence with said set of stored data generated during said sensing step so as to score said workpiece in said predetermined pattern to a controlled extent at points along said pattern corresponding to said workpiece thickness at each of said points.

15. The method according to claim 14 wherein in said step of controlling the scoring effect of said laser beam, a depth of scoring of said workpiece is varied so as to produce a substantially controlled remaining thickness of said workpiece along said pattern.

16. The method according to claim 14 wherein said step of controlling said laser beam includes the step of varying the intensity of said laser beam to vary the extent of workpiece scoring.

17. The method according to claim 16 wherein said step of controlling the scoring effect of said laser beam includes the steps of generating a set of intensity values predetermined to produce a corresponding extent of scoring of said workpiece, and setting said power intensity values in correspondence with said set of stored data.

18. The method according to claim 14 wherein the step of controlling the scoring effect of said laser beam includes the step of varying a velocity with which said scoring laser beam is caused to trace said pattern to thereby control the extent of scoring of said workpiece.

19. The method according to claim 14 wherein the step of controlling the scoring effect of said laser beam includes the step of varying a depth location of a focal point of said laser beam relative to said workpiece surface to be traced by said scoring laser beam.

20. The method according to claim 14 wherein said sensing step includes the step of detecting a location of said workpiece surface to be scored at points along said pattern and generating a corresponding first set of stored signals.

21. The method according to claim 20 wherein said sensing step includes the step of generating a gaging laser beam and scanning said workpiece surface along said predetermined pattern prior to scoring of said surface by said scoring laser beam.

22. The method according to claim 14 wherein said method includes the step of sensing the thickness of said workpiece at each point in said pattern just before scoring said workpiece at said point.

23. The method according to claim 14 wherein said sensing step comprises the step of generating a gaging laser beam and tracing said workpiece surface in said predetermined pattern prior to scoring of said surface by said scoring sensor, and generating a second gaging laser beam tracing said workpiece fixture surface in said predetermined pattern.

24. The method according to claim 14 wherein said sensing step includes the step of mounting a sensor carried with said scoring laser so as to scan said workpiece surface in said pattern just prior to scoring by said scoring laser beam.

25. The method according to claim 14 further including the step of shifting said workpiece between a first station whereat said workpiece thicknesses are sensed and a second station in a second offset position, whereat said workpiece surface is scored by said scoring laser beam.

26. The method according to claim 14 further including the step of scanning a scored groove after said scoring is carried out by said scoring laser beam and generating a stored set of data corresponding to the degree of scoring.

27. The method according to claim 14 further including the step of pressing said workpiece against said fixture locating surface.

28. The method according to claim 14 wherein said workpiece comprises an interior trim piece used to cover an air bag device, and said scoring is used to preweaken said trim piece to enable formation of an air bag deployment opening.

* * * * *

UNITED STATES PATENT AND TRADEMARK OFFICE
CERTIFICATE OF CORRECTION

PATENT NO. : 5,883,356
DATED : March 16, 1999
INVENTOR(S) : David J. Bauer et al.

Page 1 of 1

It is certified that error appears in the above-identified patent and that said Letters Patent is hereby corrected as shown below:

Column 1,
Line 20, delete "opening".

Column 4,
Line 18-19, delete "contained" and insert therefor -- contoured --.
Line 25, delete "is" and insert therefor -- are --.

Column 8,
Line 67, delete ":".

Column 9,
Line 20, delete "scored" and insert therefor -- stored --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*